United States Patent [19]

Rückwardt

[11] Patent Number: 5,170,984

[45] Date of Patent: Dec. 15, 1992

[54] HOLDING ELEMENT MADE OF PLASTIC

[75] Inventor: Hans-Werner Rückwardt, Eisenberg, Fed. Rep. of Germany

[73] Assignee: TRW United Carr GmbH & Co., K.G., Enkenbach-Alsenborn, Fed. Rep. of Germany

[21] Appl. No.: 783,545

[22] Filed: Oct. 25, 1991

[30] Foreign Application Priority Data

Oct. 30, 1990 [DE] Fed. Rep. of Germany ....... 4034546

[51] Int. Cl.⁵ .................................................. F16L 3/00
[52] U.S. Cl. .................... 248/635; 248/68.1; 248/74.2
[58] Field of Search .............. 248/68.1, 71, 74.2, 248/60, 635, 634

[56] References Cited

U.S. PATENT DOCUMENTS

| | | | |
|---|---|---|---|
| 2,138,176 | 11/1938 | Keys | 248/635 X |
| 2,912,198 | 11/1959 | Feil, Jr. | 248/60 X |
| 4,450,605 | 5/1984 | Schaty | 248/74.2 X |
| 4,550,891 | 11/1985 | Schaty | 248/74.2 X |
| 4,844,401 | 7/1989 | Tenniswood | 248/635 |
| 5,033,701 | 7/1991 | Kraus | 248/68.1 |

Primary Examiner—David L. Talbott
Attorney, Agent, or Firm—Fay, Sharpe, Beall, Fagan, Minnich & McKee

[57] ABSTRACT

The invention concerns a holding element 1 made of plastic and having at least one storage or gripping zone 5 designed for receiving and holding at least one tube-shaped part adjacent to a mounting zone 7. The holding element 1 is characterized by a three-component design which includes a first component 2 made of a hard plastic material and carrying the storage or gripping zone 5. A second component 3 formed of a soft plastic vibration damping material is positioned in component 2 and receives a third component 4 formed of hard material which is positioned in component 3 via a transverse aperture 6. Component 3 carries the mounting zone 7 which provides the ability to connect the holding element to an associated support structure.

9 Claims, 1 Drawing Sheet

HOLDING ELEMENT MADE OF PLASTIC

BACKGROUND OF THE INVENTION

The invention is directed to a holding assembly of plastic with at least one storage or gripping zone for receiving and holding at least one tube-shaped part adjacent to a mounting zone.

A holding assembly of this general type for acceptance of tube-shaped parts, such as vehicle fuel lines, which exhibits a holding zone between two dish-like storage or gripping zones, is already known (see for example German Printed Patent Specification 30 02 031). In this known arrangement, the tube-shaped parts are clipped into the dish-like storage or gripping zones and the entire holding assembly is connected upon a saw-tooth bolt attached to a support structure. For example, the support structure may be an automobile frame or body panel. If the tube-shaped parts are subjected to vibrations, there may, in this known prior art construction, result the disadvantage that the vibrations are transferred in an objectionable manner to the support structure, i.e., the body of the automobile.

Also known in the prior art is, additionally, a three-component holding assembly wherein a foam-like intermediary piece is embedded between two rigid parts with the foam-like intermediary piece engaging and fastening the tube-shaped elements (U.S. Pat. No. 3,447,998). Here again, there exist direct contact points between the tube-shaped parts and the rigid external part of the holding element so that with this known construction vibrations can likewise be transferred to the support structure in an objectionable manner.

In another known holding assembly, there are provided two soft inner dish-like members which engage with the tube-shaped parts being supported. The two soft inner dish-like members are arranged within one outer dish-like member made of hard material. In this structure, there also exist direct contact points from the vibrating tube-shaped parts via the inner dish-like member to the hard outer dish-like member.

SUMMARY OF THE INVENTION

In contrast thereto, it is an objective of the present invention to create a holding assembly for holding vibrating, tube-shaped parts wherein it is assured that the vibrations are not transferred to the support, for example a body of a motor vehicle, but are instead significantly damped and isolated from the support. According to the invention, this task is solved by a holding element or assembly of a three-component design comprising a first component made of a hard material, and which exhibits the storage or gripping zone. A second component made of a soft, damping material is positioned in the first component and a third component of hard material is carried in an aperture of the second component. The third component carries the holding zone and provides the means for connecting the assembly to an associated support structure, such as a vehicle body. This design results in the advantage that there is put in place between the first and the third component an intermediate layer of damping material. In this way, the vibrations which occur through the embedded, tube-shaped parts cannot be transferred to the support structure.

In accordance with more limited aspect of the invention, the holding element may be equipped with storage or gripping zones arranged on both sides of the holding zone. Also, the first part can have between the two storage zones a recess, equipped with end flanges, for acceptance of the second part. The second part may, for instance, be mechanically put in place or loaded into the first part via the two-component injection molding method. Preferably, the recess which carries the second part exhibits at least two oppositely facing, wedge-shaped tapering surfaces which are bordered on the upper and lower surface by the end flanges. This guarantees efficient embedding of the second part in the first part.

The aperture of the second part can lie symmetrically to the storage zone and may, for example, be designed cylindrically. In order to provide support for the third part within the aperture, there may, for example, be one or several struts provided in the interior wall of the cylindrical aperture.

By way of further refinement of the invention, the holding zone of the third part may be designed as a profiled bolt receiving aperture, or as a clip element or as a profiled bolt.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
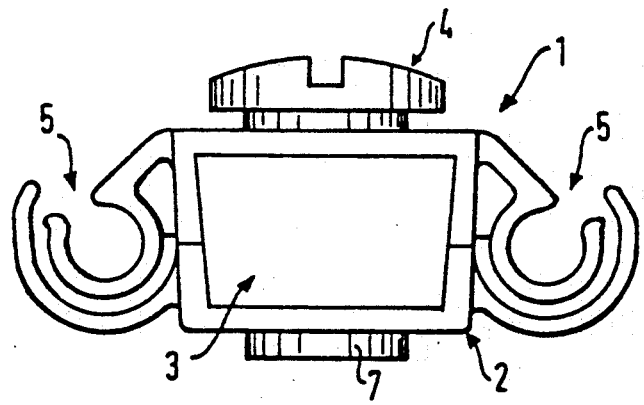
FIG. 1 is a side elevational view of a preferred embodiment of the holding element of the invention.
Figure 2:
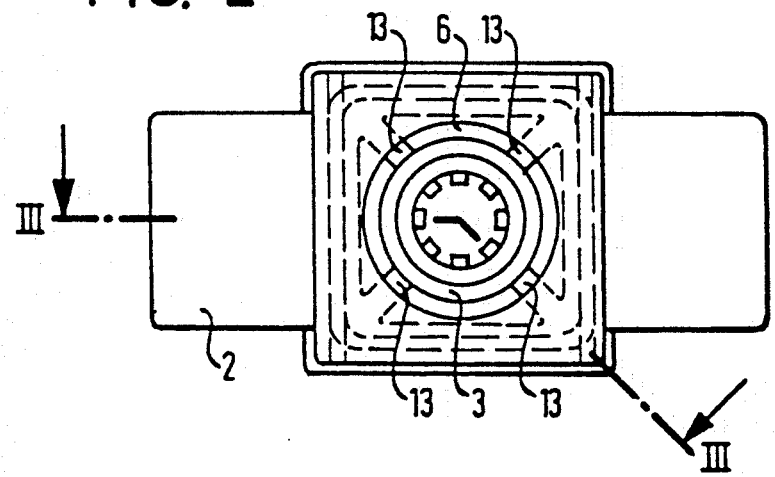
FIG. 2 is a bottom view of the holding element according to FIG. 1.
Figure 3:
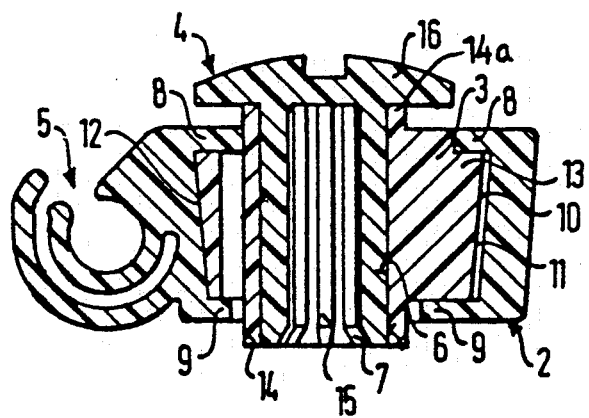
FIG. 3 is a cross-sectional view taken on line III—III of FIG. 2.

Referring more particularly to FIGS. 1 to 3 of the drawings, the holding element or assembly 1 is formed and generally comprises three components, namely a first component 2, made of a hard plastic material, which includes in the present embodiment two storage or gripping zones 5 of known form designed to resiliently grip and hold tubular or tube-like members which as vehicle fuel lines. A second part 3, is made of soft resilient plastic material having vibration damping qualities and a third part 4 is made of hard rigid plastic material. The third part 4 is placed in this arrangement via an aperture 6 in the second part 3 and shows a holding or mounting zone 7 which is positioned between the two storage zones 5 of the first part 2.

The first component 2 includes a recess 10 located centrally between both storage zones 5. The recess 10 may be of somewhat angular configuration as seen in FIG. 1. This recess 10 is sized for acceptance and holding of the second component 3. In the upper and lower zones of the recess 10, end flanges 8 and 9 are provided which guarantee that, as seen in FIG. 3, the second component 3 cannot slide out of the first part 2 in undesirable fashion.

For further, more secure anchoring of the second component 3 in the first component 2, the recess 10, as best seen in FIGS. 2 and 3, includes at least two opposing, tapering areas 11 and 12, which are bordered at the top and at the bottom by inwardly extending end flanges 8 and 9. As a result of this generally conical shape there results, in interaction with the end flanges, excellent mounting of the second component 3 in the first component 2.

The second component carries a vertically extending through-aperture 6, which is positioned symmetrically relative to the storage zones 5. This through-aperture 6 is defined by a cylindrical center portion of the second component. As shown in FIG. 2, longitudinally extending struts 13 support the cylindrical center portion from the outer peripheral walls of the second component. In the present embodiment, four of the longitudinally extending struts 13 are arranged about the circumference of the cylindrical aperture 6 and join with the outer peripheral wall at their corner intersections. These struts make sure that undesirable vibrations will experience a damping and that such vibrations will not be transferred in undesirable fashion to the support structure to which the assembly is connected by way of the third component.

It is further evident from FIG. 3 that the second component 3 in the region of its aperture 6 is equipped at both ends with collars 14, 14a, respectively, which project beyond the first component 2. In the subject embodiment, the collars 14 and 14a are end portions of the central cylinder section of second component 3. This third component 4 is equipped with an actuation head 16, which is positioned with its bottom surface against collar 14a of the second component 3. The purpose of this actuation head 16 is to permit the rotation of component 4 so that the holding element 1 can be selectively removed from a profiled bolt (not illustrated) to which it has been mounted.

In the subject embodiment and as best seen in FIG. 3, the holding zone 7 of the third component 4 is represented as a profiled bolt acceptance aperture 15. The aperture 15 has longitudinally extending ribs of known design for engaging the mounting bolt. The possibility also exists—which is not represented in detail—that holding zone 7 can be designed as a clip element or as a profiled bolt. The exact manner of connecting the third component to the associated support structure can be varied to suit the needs of any particular installation.

Due to the fact that between the first component 2, which carries in the storage zones 5, tube-shaped, vibrating parts, and the third component 4, which is attached by the holding zone 7, to a support, there is arranged a second component 3, made of soft plastic material, which in addition, according to FIG. 2, exhibits support ribs 13,—thus guaranteeing in simple but effective manner, excellent damping from undesirable vibrations between the tube-shaped parts and the support.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a holding assembly formed of plastic with a mounting zone for connecting the assembly to a support and carrying at least one storage zone for acceptance and mounting of at least one tube-shaped part, the improvement wherein the assembly comprises a three-component construction with one first part (2) of hard material carrying the storage zone (5), a second part (3) placed therein and formed of soft, damping material with a third part (4) formed of hard material vibration isolated from the first part by being placed in a transverse aperture (6) formed in the second part and the transverse aperture 6 defined by collars (14, 14a) of the soft, damping material, said collars being disposed between the one first part and the third part and preventing contact between the one first part and the third part, said third part carrying the mounting zone for connecting the assembly to a support.

2. A holding assembly according to claim 1, with storage zones arranged on both sides of the mounting zone wherein the first part (2) exhibits between the two storage zones (5) a recess (10) equipped with end flanges (8,9), for receiving of the second part (3).

3. A holding assembly according to claim 2 wherein in the recess (10) exhibits at least two opposing, cone-shaped tapering surfaces (11, 12) which are bordered at the top and bottom surface by the end flanges (8, 9).

4. A holding assembly according to claim 1 wherein the transverse aperture (6) of the second part (3) is positioned symmetrically to the storage zones (5).

5. A holding assembly according to claim 4 wherein the transverse aperture (6) is symmetrically shaped.

6. A holding assembly according to claim 1 wherein the second part comprises at least one longitudinally extending strut arranged about the collars.

7. A holding assembly according to claim 1 wherein the second part comprises at least one peripheral wall disposed about and in spaced relation to the collars.

8. A holding assembly according to claim 7 wherein the second part further comprises at least one longitudinally extending strut arranged between the collars and the peripheral wall.

9. A holding assembly according to claim 7 wherein the at least one peripheral wall is rectangular.

* * * * *